United States Patent

Lepold et al.

[15] 3,703,797
[45] Nov. 28, 1972

[54] ADSORPTION PROCESS FOR THE COMPLETE AND NON-DISSIPATIVE SEPARATION OF A GAS MIXTURE INTO ADSORBABLE AND NON-ADSORBABLE, IN PARTICULAR RADIOACTIVE COMPONENTS

[72] Inventors: Manfred F. Lepold, Merzenich Uber Dueren; Gerhard Heinze, Schildgen; Gustav Kaule, Cologne-Stammheim; Ernst Podschus, Leverkusen, all of Germany

[73] Assignee: Bayer Aktiengesellschaft, Leverkusen, Germany

[22] Filed: Sept. 5, 1969

[21] Appl. No.: 855,697

[30] Foreign Application Priority Data

Sept. 13, 1968 Germany..........P 17 94 140.1

[52] U.S. Cl............................................55/62, 55/68
[51] Int. Cl. .............................................B01d 53/04
[58] Field of Search............55/25, 58, 62, 66, 68, 74, 55/75, 179, 387, 389

[56] References Cited

UNITED STATES PATENTS

| | | |
|---|---|---|
| 3,085,379 | 4/1963 | Kiyonaga et al. ..............55/58 |
| 3,243,938 | 4/1966 | Lavery et al...................55/62 |
| 3,257,773 | 6/1966 | Connors et al. ...............55/62 |
| 3,335,546 | 8/1967 | Wunning.......................55/62 |
| 3,338,030 | 8/1967 | Feldbauer, Jr.................55/62 |
| 3,494,102 | 2/1970 | Dunn, Jr.......................55/62 |

*Primary Examiner*—Charles N. Hart
*Attorney*—Connolly and Hutz

[57] ABSTRACT

Process for the complete separation of an adsorbable gas component A from another substantially non-adsorbable gas component B in at least two adsorption zones 1 and 2 arranged one behind the other, comprising the following steps:

a. in the first step the adsorption zone 1 is loaded until completely saturated with the component A;
b. in the second step the feed gas in the interstitial volume of adsorption zone 1 is displaced with pure component A from a storage means and the sweeping gas, optionally together with the feed gas is delivered to the partially unloaded zone 2;
c. in the third step the pure component A is liberated by heating of zone 1 and is delivered to a storage means. Thereafter the aforesaid steps are repeated however with interchanged functions of zones 1 and 2.

5 Claims, 1 Drawing Figure

PATENTED NOV 28 1972
3,703,797
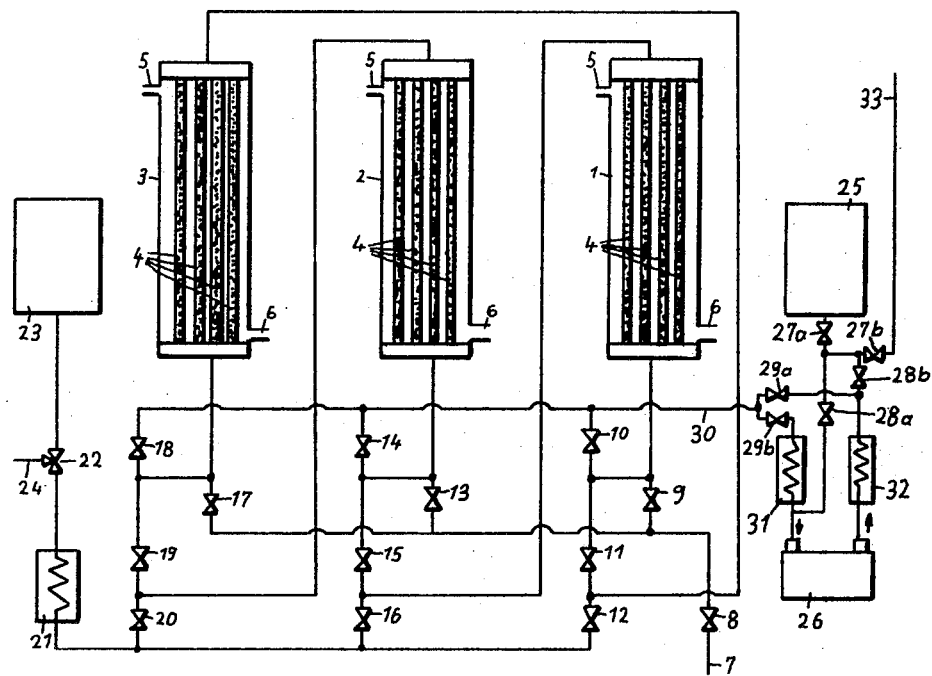

ADSORPTION PROCESS FOR THE COMPLETE AND NON-DISSIPATIVE SEPARATION OF A GAS MIXTURE INTO ADSORBABLE AND NON-ADSORBABLE, IN PARTICULAR RADIOACTIVE COMPONENTS

In the purification of gases by adsorption, the component present in a relatively small quantity is generally anchored to a suitable adsorbent. The adsorbent is usually regenerated by an increase in temperature and/or by a reduction in pressure. Examples of adsorbents include active carbon, silica gel and, more recently in evidence, natural and synthetic zeolites, so-called molecular sieves. Activated carbons adsorb gases and vapors with hardly any selectivity, the order in which the gases and vapors are adsorbed being largely determined by their respective boiling points. Molecular sieve zeolites show an outstanding sorptive capacity with respect to polar or polarizable substances such as $H_2O$, $H_2S$ or $CO_2$. Accordingly, they are used for the separation of polar or polarizable substances from less polarizable substances, for example in the high purification of gases.

Several processes for removing carbon dioxide from gas mixtures are known. According to French Pat. Specification No. 1,384,954 for example, carbon dioxide, is adsorbed on zeolites as an impurity in inert gases. The apparatus suitable for carrying out this process consists of several, preferably three adsorption chambers. The impurities are adsorbed from the protective or inert gas in the first chamber. At the same time, the second chamber is regenerated by heating and sweeping the adsorbent. In the third chamber, the regeneration process is completed by cold-blowing and sweeping with an inert gas. After the third chamber has been made re-adsorbent, the first chamber is regenerated and the second chamber is cooled.

In conventional adsorption processes, the adsorbed component is not obtained in completely pure form during regeneration. It is either contaminated by the sweeping gas, or, in cases where regeneration is carried out in the absence of a sweeping gas, some of the desorbate has to be discarded because it is contaminated by the impure or crude gas in the interstitial volume.

In the recovery of pure $SO_2$ by adsorption from roaster gases, the desorbate has to be obtained free from accompanying gases, whilst the $SO_2$ has to be completely removed from the residual gases let out into the atmosphere. Equally stringent requirements regarding the separation of gas mixtures are imposed on certain processes in nuclear technology. The waste gases formed by the reprocessing of irradiated nuclear fuel elements containing carbon, contain inter alia the noble gases as fission products, for example, in addition to $CO_2$ as their main constituent. To prevent atmospheric pollution, especially in populated areas, these fission gases have to be removed completely from the waste gases and, on economic reasons, have to be recovered as a concentrated radioactive waste.

These requirements cannot be satisfied by the processes mentioned above.

The process according to the invention overcomes these difficulties. The process of the invention achieves the complete non-dissipative separation of a feed gas mixture comprising an adsorbable component A and a substantially non-adsorbable component B in an installation comprising at least two adsorption systems 1 and 2 arranged one behind the other.

The process according to the invention comprises the following:

In a first stage an adsorption system 1 is loaded until it is completely saturated with the component A. In a second stage the feed gas in the interstitial volume is displaced by the pure component A delivered from a source of supply and the sweeping gas is delivered, optionally together with the feed gas, to the still unloaded adsorption system 2. In a third stage the pure component A is liberated by regenerating the system 1 and is delivered to the source of supply. On completion of regeneration and cooling of the system 1, stages 1 to 3 are repeated on systems 1 and 2 with interchanged functions.

The drawing illustrates a process for separating $CO_2$ and noble gases.

The apparatus diagrammatically illustrated in the drawing for the separation of $CO_2$ and noble gases comprises the adsorption towers 1, 2 and 3, preferably in the form of tubular heat exchangers. The adsorbent is accommodated in the tubes 4 whose diameter must be kept small to ensure good heat dissipation. The heating and cooling medium entering at 5 and issuing 6 flows through the space around the tubes. The gas to be purified reaches the installation through a pipe 7 and a shut-off valve 8.

During the first stage of the process, valves 9, 15 and 20 are open and valves 10, 12, 13 and 14 and also valves 16, 17 and 19 are closed. The gas flows successively through the adsorption towers 1 and 2, $CO_2$ being adsorbed on the adsorbent within the tubes 4. At the same time, coolant flows through the towers 1 and 2 from 5 to 6. The residual gas passes through a condenser 21 and a three-way valve 22 into a gasometer 23. The residual gases collected in the gasometer (noble gases, nitrogen) can be removed through the three-way valve (22) and a pipe 24.

During filling off the towers 1 and 2, the tower 3 is being swept in a second process stage with pure $CO_2$ from a storage gasometer 25. Valves 27b, 28b and 29i are then closed, so that a pump 26 delivers $CO_2$ from the gasometer 25 through the open valves 27a, 28a and 29a into a pipe 30 leading through an open valve 18 into the adsorption tower 3, sweeps the adsorbent in the tubes 4 and, together with the feed gas sweeps out of the interstitial volume, is fed through the open valve 11 into the tower 1.

After sweeping the tower 3 is regenerated in a third process stage. Whilst the heating medium flows through the tower 3 from 5 to 6, the desorbed pure $CO_2$, following the closure of the valve 11, the valves 28a and 29a being also closed, is evacuated through the pipe 30, the open valve 29b the condensers 31 and 32 and the open valve 28b, the supply in the gasometer 25 being initially topped up and the excess being then removed through the pipe 33 following the closure of the valve 27a and the opening of the valve 27b. On completion of desorption, the adsorption tower 3 is cooled by the coolant flowing from 5 to 6. Following closure of the valve 18, the vacuum in the tower 3 is eliminated by opening the valve 12 with inflowing rare gas from the gasometer 23. Accordingly, the tower 3 is ready for adsorption again and, following the opening of the valve 19 and the closure of the valve 20, is arranged behind the tower 2. On completion of saturation, the tower 1 is prepared for sweeping and regeneration by opening the valve 13 and closing the valves 9 and 15.

The towers 1, 2 and 3 are successively switched in alternation to the functions of filling, sweeping and regeneration, the last tower to be regenerated being always arranged behind that which is about to be filled for reasons of safety.

One important application of the process diagrammatically illustrated in FIG. 1 is the processing of waste gases from the disintegration by combustion of irradiated nuclear fuel elements containing graphite, in whose case the moderator graphite is homogeneously mixed with the nuclear fuel. The problem to be solved here is to remove all the radioactive constitutents from the waste combustion gas producing minimal radioactive waste.

The process according to the invention is described in detail in the following Example:

EXAMPLE

Irradiated nuclear fuel elements containing graphite are burnt in a combustion plant. The amount of carbon burnt off per hour amounts to approximately 350 g. For an input of 725 Nl of oxygen per hour, a waste combustion gas consisting of approximately 653 Nl of $CO_2$/hour and approximately 72 Nl of $O_2$/hour is formed at a temperature of around 1100°C. This corresponds to a gas composition of approximately 90 percent by volume of $CO_2$ and 10 percent by volume of $O_2$. The inert gas component is less than 1 percent by volume. The fission products liberated cannot be measured in terms of volume. The concentration of Kr 85 amounts to 0.4 Ci/Nm$^3$, whilst that of I 131 amounts to 15.5 Ci/Nm$^3$ of combustion gas.

In order to separate in advance the entrained suspended particles and readily condensible fission products, the combustion gas has to pass through a metal sinter filter, a condenser, a preliminary filter and an absolute filter. It is cooled to 300°C. In order to remove the oxygen, 11 Nl of CO/hour are fed in. The mixed gas has a composition of approximately 75 percent by volume of $CO_2$, 16.6 percent by volume of CO and 8.3 percent by volume of $O_2$, with an inert gas component of less than 1 percent by volume, a noble gas component as fission product of less than 0.01 percent by volume I-131, Ru-106 and tritium. The mixed gas is converted at 300°C on a catalyst into 99.1 percent by volume carbon dioxide, which only contains the fission products and inert gases ($N_2$ and Ar) in a quantity of 0.9 percent by volume. The gas is cooled to 50°C. It reaches an filter of active carbon on which fission iodine and fission ruthenium are separated. The filter is followed by a tritium adsorber i.e., a filtering layer consisting of a zeolite molecular sieve. Tritium, which occurs as polarizable tritium oxide, is adsorbed here better than carbon dioxide because by virtue of its greater polarizability, $T_2O$ displaces the $CO_2$. The waste gas reaches the arrangement shown in FIG. 1 through the pipe 7 at a temperature T 32 50°C. At this point it consists of 99.1 percent by volume of $CO_2$ and 0.9 percent by volume of inert gases. Of radioactive fission products, only Kr-85 is still present in a concentration of 0.365 Ci/Nm$^3$.

The adsorption towers 1, 2 and 3 each consist of 7 tubes 2500 mm long with a free diameter of 50 mm. They are each filled with 30 kg of synthetic zeolite of 5 A pore diameter with a particle size of 1 to 4 mm, known commercially as Bayer Zeolith K 10. Air in a quantity of 500 Nm$^3$/hour is used as the coolant to dissipate the heat of adsorption, whilst air heated to 250°C. is used as the heating medium in a quantity of 200 Nm$^3$. The gasometer 23 contains 40 Nl of non-sorbable gases, whilst the gasometer 25 contains a supply of approximately 300 Nl of pure $CO_2$ for sweeping. The radioactive noble gases, together with nitrogen and argon accumulate in the gasometer 23, whilst pure $CO_2$ periodically leaves the installation through the pipe 33.

The loading of a tower takes about 2 hours. The exact moment when saturation is reached is determined by measuring the temperature at the end of the bed. The concentration of Kr–85 in the $CO_2$ flowing off amounts to 0.06 × 10$^{-3}$ Ci/m$^3$, corresponding to a decontamination factor of 6 × 10$^3$.

What is claimed is:

1. Process for the complete separation of an adsorbable gas component A from a substantially non-adsorbable gas component B both contained in a feed gas in at least two adsorption zones being arranged one behind the other comprising the following steps:
    a. the first adsorption zone is contacted with the feed gas for a time sufficient to saturate said first adsorption zone with said adsorbable component A, and said non-adsorbable gas component B which passes completely pure through the first adsorption zone is collect;
    b. the feed gas in the interstitial volume of said first adsorption zone is replaced with completely pure adsorbable gas component A to saturate said first adsorption zone therewith by contacting said first zone with a sweeping gas consisting of said completely pure component A, and the replaced feed gas is delivered together with the sweeping gas to an at least partially unloaded second adsorption zone;
    c. the completely pure component A is liberated from the first adsorption zone by heating said zone removed and collected;
    d. steps a) - c) are repeated with interchanged adsorption zones.

2. Process according to claim 1, wherein the replaced gas and the sweeping gas are fed into the second adsorption zone together with feed gas.

3. Process according to claim 1, wherein at least three adsorption systems are arranged one behind the other to provide said adsorption zones, step a) is simultaneously performed in two of said adsorption systems connected in series with each other and steps b) and c) are successively performed in the third adsorption system.

4. Process according to claim 1, wherein $CO_2$ and noble gases are completely separated and wherein the sweeping gas is $CO_2$.

5. Process according to claim 1 wherein steps a) and b) are simultaneously performed and the partially unloaded second adsorption zone to which the products of step b) are delivered is the same as the first adsorption zone referred to in step a).

* * * * *

UNITED STATES PATENT OFFICE
CERTIFICATE OF CORRECTION

Patent No. 3,703,797     Dated November 28, 1972

Inventor(s) Manfred F. Lepold, Gerhard Heinze, Gustav Kauke & Ernst Podschus

It is certified that error appears in the above-identified patent and that said Letters Patent are hereby corrected as shown below:

"Column 3, line 27, "725 Nl" (1 numeral) should read

-- 725 Nl -- (1 letter)

Column 3, line 62, "T 3250°C" should read

-- T=50°C --

Column 4, line 33, "collect" should read

-- collected -- .

Signed and sealed this 10th day of July 1973.

(SEAL)
Attest:

EDWARD M. FLETCHER, JR.
Attesting Officer

Rene Tegtmeyer
Acting Commissioner of Patents